United States Patent Office 3,049,534
Patented Aug. 14, 1962

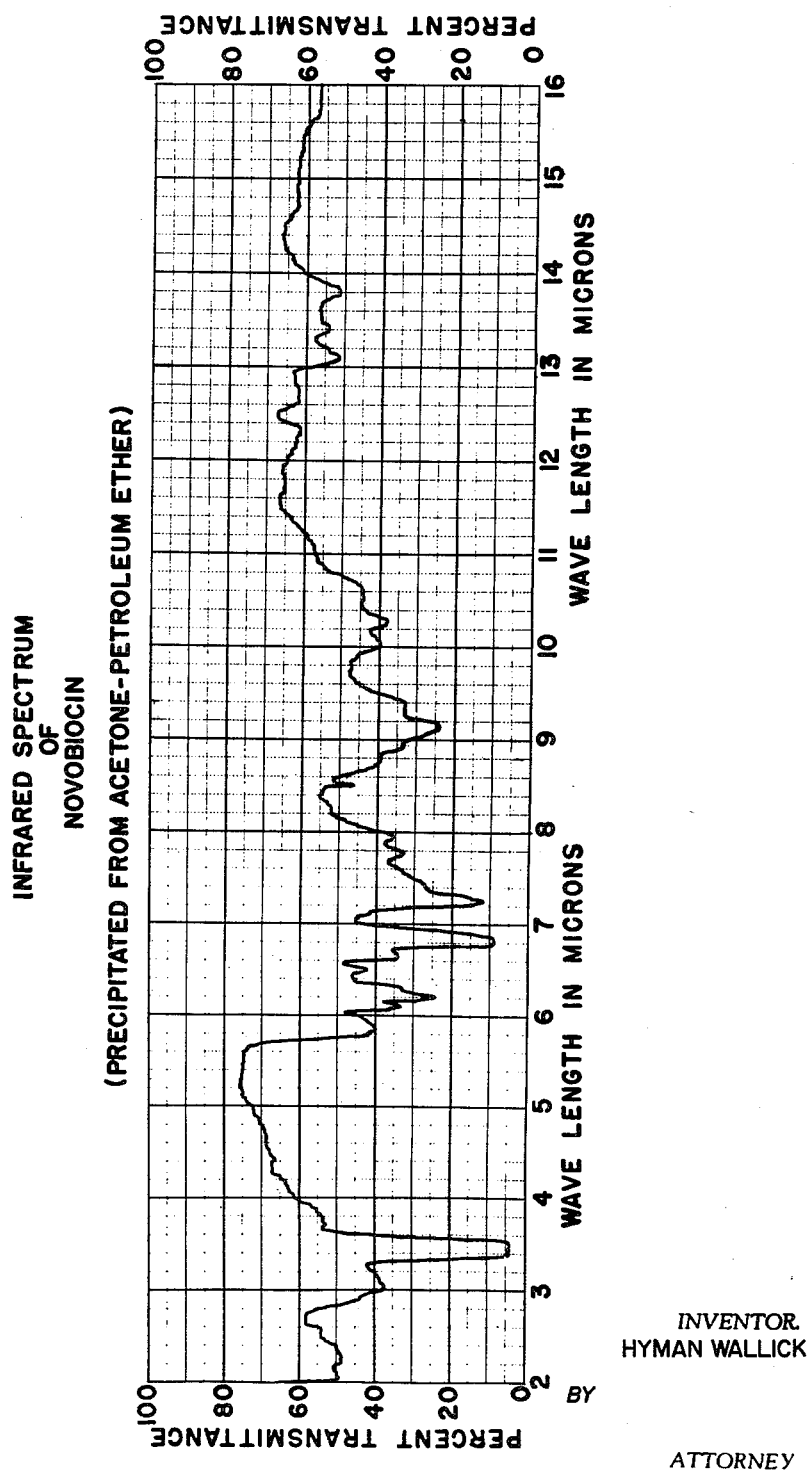

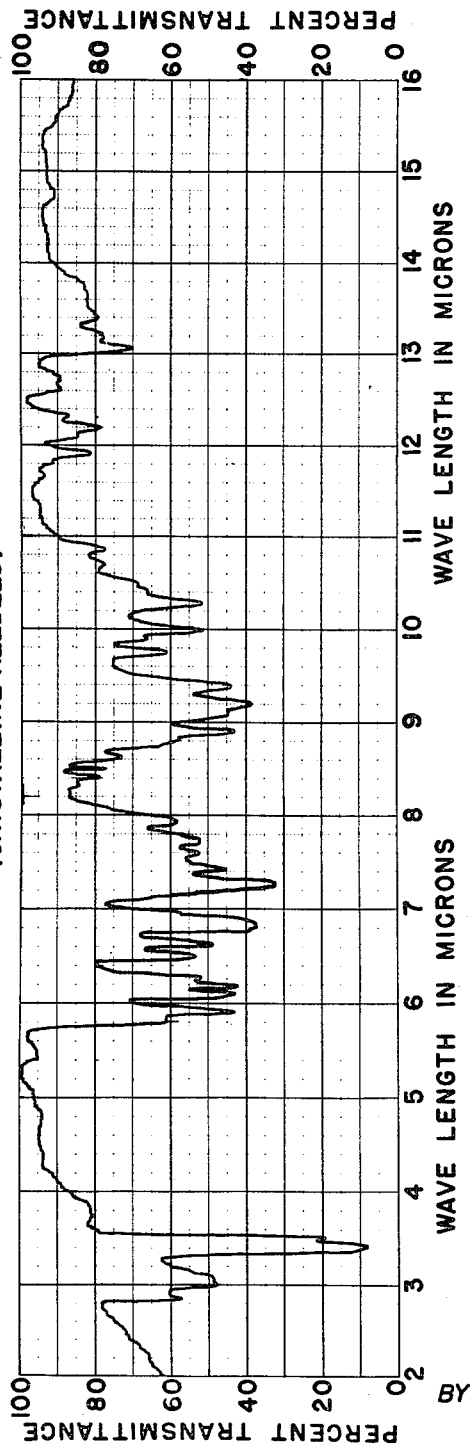
Fig. 2. - INFRARED SPECTRUM OF NOVOBIOCIN (CRYSTALLINE NEEDLES)

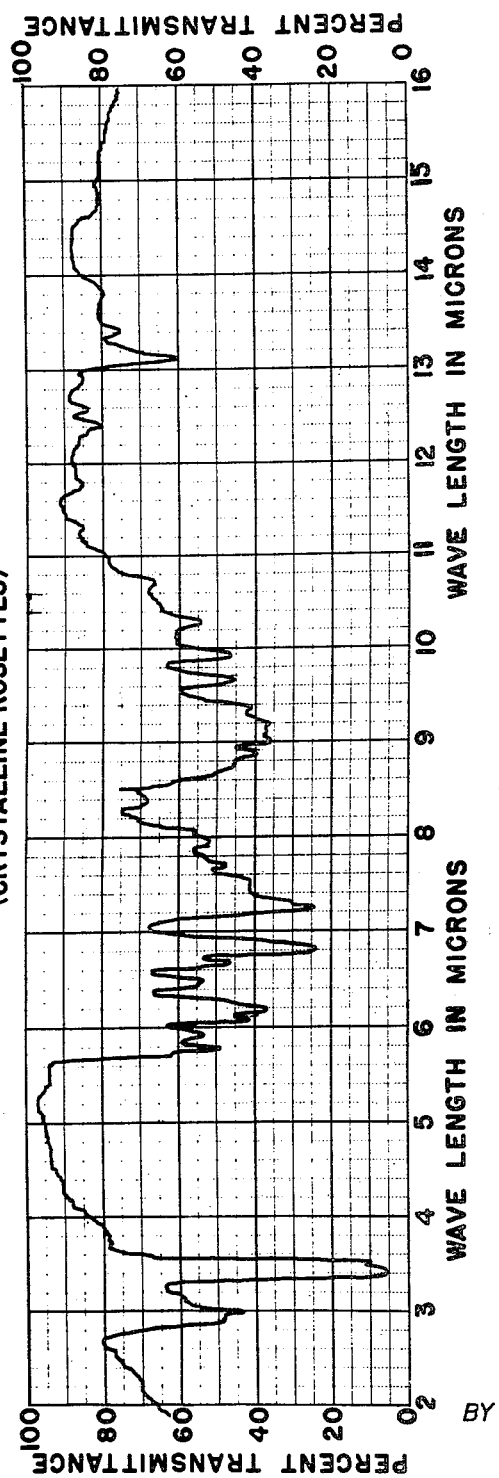

3,049,534
ANTIBIOTIC AND PROCESS OF PRODUCING THE SAME
Hyman Wallick, Elizabeth, N.J., assignor to Merck & Co., Inc., Rahway, N.J., a corporation of New Jersey
Filed Mar. 7, 1956, Ser. No. 570,184
13 Claims. (Cl. 260—210)

This invention relates to new antibiotic agents and processes of preparing the same. More particularly, it is concerned with a novel antibiotic substance known as novobiocin and with processes for its production.

This application is a continuation-in-part of our copending application Serial No. 502,826, filed April 21, 1955 now abandoned.

The discovery of the remarkable antibiotic properties of penicillin stimulated great interest in this field which has resulted in the finding of many other valuable antibiotic substances such as: streptomycin, streptothricin, gramicidin, subtilin, bacitracin, chlortetracycline, oxytetracycline, terramycin, and the like. In general, such antibiotics are particularly active against certain gram negative bacteria, others are active against gram positive bacteria, and some are active against both gram negative and gram positive bacteria. However, the activity of these known antibiotics is usually limited to a few pathogenic microorganisms, and work has been continued in this field in an attempt to find other antibiotics which would be effective against other pathogens.

Although some of these antibiotics have been found to be invaluable in the treatment of various diseases, it is found that certain strains of some pathogens develop a resistance to a particular antibiotic, and as a result the antibiotic is no longer active against such resistant strains.

Accordingly, the deficiencies of the known antibiotics has stimulated further research to find other antibiotics which will be active against a wider range of pathogens as well as resistant strains of particular microorganisms.

It is an object of the present invention to provide a new and useful antibiotic which is highly effective in inhibiting the growth of pathogenic bacteria, particularly the gram positive microorganisms. Another object is to provide a process of preparing this novel antibiotic substance by the fermentation of nutrient mediums with suitable strains of a heretofore unknown microorganism. Other objects will be apparent from the detailed description hereinafter provided.

The new antibiotic substance of the present invention is formed by growing, under controlled conditions, a previously unknown species of microorganism which has been named *Streptomyces spheroides*. The microorganism was isolated from a sample of soil from an old sod pasture in Vermont. This new microorganism has been designated *Streptomyces spheroides* MA-319 in the culture collection of Merck & Co., Inc., Rahway, New Jersey. A culture thereof has been deposited with the Fermentation Section of the Northern Utilization Research Branch, United States Department of Agriculture at Peoria, Illinois, and added to its permanent culture collection as NRRL 2449.

The morphological and cultural characteristics of *Streptomyces spheroides* are set forth in the following table:

*Streptomyces spheroides*

Morphology—(Studied on YED, Czapek's sucrose, and glucose-asparagine agar). Spores oval and 0.7 to 1.1μ wide by 1.5 to 2.0μ long. Some spirals are open but the majority are closed and compact. In some areas the spirals appear ball-like.

Czapek's sucrose—Rapid clear growth. Abundant white aerial mycelium tinged with cream to olive-grey. No growth into medium. No soluble pigment. Reverse white becoming straw-colored. Surface growth shiny.

Gelatin—Liquefaction beginning in 2–3 days. Complete liquefaction in 10–11 days. No soluble pigment. Cream-colored, flaky sediment.

Glucose asparagine agar—Abundant white aerial mycelium becoming gray. No soluble pigment.

Glucose-peptone agar—Moderate yellow growth. Greyish-white aerial mycelium. Reverse, straw-colored. No soluble pigment.

Glucose broth—Pellicle. On agitation, falling to bottom of tube. No soluble pigment. Surface pellicle in old culture.

Milk—28° C.–7 days, no change; 14 days ring pH 7.0; 15–23 days, coagulation and peptonization, beginning; 23 days, pH 6.5. Coagulation complete in 45 days. 37°—No growth.

Potato plug—Slow. Scant, white growth in 7 days. 14 days: heavy, greyish growth. Grey aerial mycelium. Potato becoming dark brown.

Starch agar—Soluble starch: 4 days—starch hydrolyzed. Heavy growth; white aerial mycelium. Reverse, cream to straw-colored. Potato starch: 4 days—starch hydrolyzed. Heavy growth; transparent, colorless growth becoming grey to greyish-white. White aerial mycelium.

Nitrate agar—2 days: faint reduction to nitrite. 4 days: faint reduction to nitrite.

Nutrient-glucose agar—Moderate colorless growth. Abundant white aerial mycelium. Reverse, pale straw colored. No growth into medium.

Milk agar—Hydrolysis of casein under colonies only.

Carrot—Very heavy white growth.

Citrates—Very scant growth.

Optimum temperature—20–26° C.: Good growth. 28° C.: Excellent growth. 37° C.: No growth. 50° C.: No growth.

Indole—Negative.

Tyrosine agar—Abundant white aerial mycelium. No pigment. 18 days: straw-colored pigment. 60 days: dark-brown soluble pigment.

Glycerol nutrient agar—Abundant white aerial mycelium. Straw-colored to amber soluble pigment. No growth into medium. Reverse, cream-colored.

Czapek's sucrose—Abundant white growth in form of pellicle. White sediment in bottom of tube and adhering to the wall of the tube, both above and below level of fluid. Reverse, straw-colored.

Cellulose—No growth.

Ca-malate—Moderate amount white aerial mycelium. Moderate amount of growth into medium. No soluble pigment. Reverse, no color.

Carbohydrates—Alkaline reaction, no gas from adonitol, arabinose, cellobiose, dextrin, dextrose, galactose, lactose, levulose, maltose, mannitol, mannose, raffinose, rhamnose salicin, sucrose, and xylose.

The above description of the microorganism-producing novobiocin is given as illustrative of suitable strains of *Streptomyces spheroides* which can be used in the production of novobiocin, but it is to be understood that the present invention is not be limited to organisms answering this particular description. The present invention also contemplates the use of other species of *Streptomyces spheroides* which are mutants of the described organisms such as those obtained by natural selection, or those produced by mutating agents, for example, X-ray irradiation, ultraviolet irradiation, nitrogen mustards, and the like.

On the basis of the fact that *Streptomyces spheroides* is a saprophite and is psychrophilic to mesophilic, and does not produce soluble pigment on any organic medium other than a special medium which contains a high concentration of pyrosine; and on the basis of the fact that the aerial mycelium is abundant, white or colorless, the most closely related species described in "Bergey's Manual of Determinative Bacteriology" (sixth edition) is *Streptomyces albus*.

More recent descriptions of related cultures that have appeared since the publication of Bergey's Manual include *Streptomyces globisporus*, *Streptomyces farinosus*, *Streptomyces longisporus*, and *Streptomyces annulatus* which are described in the book "Actinomycetes and Their Antibiotics" by Waksman and Lechevalier.

*S. spheroides* may be distinguished from *S. globisporus* and *S. farinosus* on the basis that it produces tight spiral chains of conidia, whereas the latter two species produce no spirals. Spiral formation or the lack of such formation is a critical distinguishing characteristic among species of *Streptomyces*.

*S. spheroides* may be distinguished from *S. longisporus* on the basis that it does not have the cylindrical spores with sharply cut ends which characterizes *S. longisporus*.

*S. spheroides* may be distinguished from *S. annulatus* on the basis that it does not produce the concentric growth rings characteristic of *S. annulatus*.

*S. spheroides* differs from *S. albus* in two physiological characteristics. *S. albus* gives reduction of nitrate to nitrite, whereas nitrites are only faintly detectable after growth of *S. spheroides*. The growth characteristics of the two cultures also differ appreciably when grown on a potato wedge. More important, *S. spheroides* produces tight spiral conidia which frequently are so tightly wound that they appear to form tight spheres of packed spores. This characteristic is so reproducible upon successive cultivations of *S. spheroides* and so striking, that it clearly distinguishes the culture from any of the many *S. albus* cultures examined.

Novobiocin reacts like an acidic organic compound and is easily soluble in alkaline solutions such as aqueous solutions of alkali metal hydroxides, carbonates, and bicarbonates, and also in methanol, ethanol, normal butanol, secondary butanol, ethyl acetate, acetic acid, dioxane, acetone, and methyl ethyl acetone. It is insoluble or sparingly soluble in ether, benzene, chloroform, carbon tetrachloride, ethylene dichloride, water and hydrochloric acid. Novobiocin can be precipitated from alkaline solution by acidification.

Novobiocin has been obtained in two crystalline forms by the methods described below. One crystalline form of novobiocin which appears to be in the form of rosettes has a melting point at about 152–154° C.; another crystalline form which has the appearance of flat needles was found to melt at about 170–172° C. These forms are sometimes produced together and can be separated mechanically.

Novobiocin is optically active having a rotation of $[\alpha]_D^{25} = -27°$ (C, 1 in 1 N sodium hydroxide), and $[\alpha]_D^{25} = -44°$ (C, 1 in pyridine).

A solution of novobiocin in 0.1 N sodium hydroxide exhibits a characteristic ultraviolet absorption with a peak at about $$307 \text{ mu } (E_{1\,cm}^{1\%} 600)$$

A solution of novobiocin in 0.1 N hydrochloric acid in aqueous methanol also shows a characteristic ultraviolet absorption with a peak at about $$324 \text{ mu } (E_{1\,cm}^{1\%} 390)$$

A solution of novobiocin in pH 7 phosphate buffer had a principal maxima in the ultraviolet absorption spectra at $$304 \text{ mu}, (E_{1\,cm}^{1\%} 350)$$

The infrared absorption spectrum of a substantially pure sample of amorphous or submicrocrystalline form of novobiocin suspended in a mineral oil (Nujol) was taken on a Baird Associates Model 12B Infrared Spectrophotometer, using a sodium chloride prism, showed a number of characteristic peaks, the more significant of which are at the following wave lengths, expressed in microns 5.8–6.0 (broad), 6.10, 6.21, 6.30, 6.49, 6.63, 7.4–7.6 (broad-shoulder), 7.78, 7.96, 8.27 (weak), 8.60 (shoulder), 8.7 (shoulder) 9.13, 9.40, 10.0–10.1 (broad), 10.28, 10.60 (broad), 12.0–12.30 (broad), 12.60–12.75 (broad), 13.07 and 13.39. The infrared spectrum is illustrated in FIGURE 1 of the attached drawings. The sample of amorphous or submicrocrystalline novobiocin used in determining this spectrum was prepared from a sample of crystalline novobiocin by the following "normalization" procedure:

To a solution of one gram of crystalline novobiocin in 100 ml. of acetone was quickly added one liter of petroleum ether whereupon amorphous novobiocin separated from solution. The precipitated product was recovered by filtration, washed with petroleum ether and finally dried at 100° C. under reduced pressure.

Samples of substantially pure novobiocin, when normalized according to the above procedure, will exhibit the infrared absorption shown in FIGURE 1. FIGURES 2 and 3 of the accompanying drawings show the infrared spectrum of the needle and rosette crystalline forms of novobiocin respectively. Although the different crystalline forms of novobiocin exhibit different absorption spectra as shown in FIGURES 2 and 3, when these forms are "normalized" as described above, the amorphous or submicrocrystalline products will have the absorption spectrum shown in FIGURE 1.

Novobiocin contains the elements carbon, hydrogen, nitrogen, and oxygen. The following is an analysis of the elemental composition obtained on a sample of crystalline novobiocin:

| | Percent |
|---|---|
| Carbon | 60.24, 60.26 |
| Hydrogen | 6.56, 6.49 |
| Nitrogen | 4.86 |
| Oxygen | 29.3 |

According to the micro-analytical data, the composition of novobiocin is in the range expressed $$C_{30-32}H_{34-42}N_2O_{10-12}$$

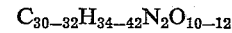

Novobiocin is an acidic substance which forms salts upon reaction with bases. Thus, upon reacting novobiocin with one equivalent of sodium hydroxide the monosodium salt of novobiocin is obtained. Reaction with two equivalents of sodium hydroxide yields the disodium salt of novobiocin. Similarly, upon reacting novobiocin with other inorganic bases, the corresponding metal salts can be obtained. When novobiocin is reacted with an organic base such as an amine, the corresponding amine salts are obtained. Thus, upon reacting novobiocin with methyl amine, the methyl amine salt of novobiocin is obtained.

The acidic nature of novobiocin is also a distinguishing characteristic of this new antibiotic. When a sample of novobiocin is titrated with sodium hydroxide two basic binding groups are observed. The first binding to form the monosodium salt occurs at a pH of about 7.0 and has a pK of about 3.8. The second binding occurs at a pH of about 11.0 and has a pK of about 9.4. Potentiometric titration in a mixture of water and acetone (3:4) showed two acidic functional groups, $pH_1$ ½ ca. 4.7, equivalent weight 653, and $pH_2$ ½ ca. 10, equivalent weight 660–680. Determination of acidic groups by the ultraviolet absorption method, gave values of $pH_1$ ½, 3.8 and $pH_2$ ½ 9.4. An ebullioscopic determination of the molecular weight of novobiocin in isopropanol-water azeotrope gave a value of $592 \pm 25$.

Crystalline novobiocin has a microbiological activity of about 5,000 units per mgm. as determined by standard cup-plate diffusion methods using *Bacillus megatherium* ATCC 9885; employing a substantially pure form of cathomycin as the standard.

Novobiocin can be represented structurally as follows:

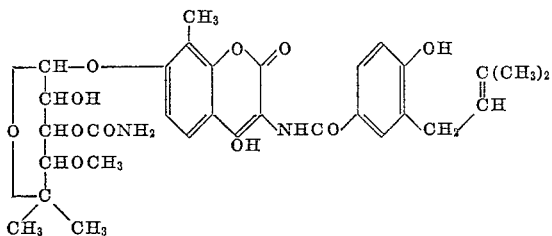

Novobiocin is active in inhibiting gram positive microorganisms primarily, although it also exhibits some activity against gram negative microorganisms. Among the organisms whose growth is inhibited by very low concentrations of novobiocin or its salts that might be mentioned are *M. pyogenes* var. *albus*, *M. pyogenes* var. *aureus*, *Streptococcus pyogenes*, *Proteus vulgaris*, *Pasteurella multocide*, *Hemophilus pertusis*, *Pasteurella avicida*, *Diplococcus pneumoniae*, *Corynebacterium diphtheriate* type *intermedius*, *Corynebacterium diphtheriate* type *mitis*, *Corynebacterium xerose*, *Corynebacterium renale*, *Neisseria meningitidis*, *Sarcina lutea* (VD), *M. pyogenes* var. *aureus* resistant to aureomycin, *M. pyogenes* var. *aureus* resistant to streptomycin-streptothricin, and *M. pyogenes* var. *aureus* resistant to penicillin.

For example, the sodium salt of novobiocin when tested by the agar streak dilution assay was found to inhibit the growth of various strains of *M. pyogenes* var. *aureus*, *M. pyogenes* var. *albus*, *Neisseria meningitidis* (No. 274), and *Sarcina lutea* (VD) at concentrations below 0.5 mcg. per ml. Other microorganisms are also affected by novobiocin or its salts in varying degrees.

Novobiocin is well tolerated in mice, rats and dogs after single or repeated oral administration. In mice the $LD_{50}$ is about 2.0 gm./kg. No evidence of toxicity is produced in rats or dogs dosed with 0.2 gm. of novobiocin per kg. daily for 90 to 140 days.

Novobiocin is produced during the aerobic fermentation of suitable aqueous mediums, under conditions described hereinafter, by strains of *Streptomyces spheroides*. Aqueous mediums such as those employed for the production of other antibiotics are suitable for the production of novobiocin. Such mediums contain sources of carbon and nitrogen assimilable by the microorganisms and inorganic salts. In addition, the fermentation mediums contain traces of metals necessary for the growth of the microorganisms which are usually present in complex sources of carbon and nitrogen of the medium.

In general, carbohydrates such as sugars, for example, dextrose, sucrose, maltose, lactose, dextrin, and the like, and starches are suitable sources of assimilable carbon in the nutrient mediums. The exact quantity of the carbon source which is utilized in the medium will depend, in part, upon the other ingredients of the medium, but it is usually found that an amount of carbohydrate between about 1 and 6% by weight of the medium is satisfactory.

These carbon sources can be used individually or several such carbon sources may be combined in the medium.

Various nitrogen sources such as casein hydrolysates, papaic digests of soybean meal, peanut meal, peanut oil meal, distiller's solubles, corn steep liquors, sodium nitrate, ammonium chloride, ammonium sulfate, and the like are readily assimilated by *Streptomyces spheroides* and can be used in the fermentation mediums for the production of the new antibiotic. In general, we find that organic sources of nitrogen, particularly soybean meal and distiller's solubles, are very satisfactory for the production of novobiocin. The various organic and inorganic sources of nitrogen can be used either alone or in combination in amounts ranging from 0.2 to 6% by weight of the aqueous medium.

We have also found that the addition of sodium chloride to a medium containing suitable sources of carbon and nitrogen in an amount ranging from 0.1 to 1% is desirable for the production of the new antibiotic. In general, we find that an amount of sodium chloride equivalent to about 0.25% by weight for the nutrient medium is most satisfactory.

The following are examples of mediums suitable for growing *Streptomyces spheroides* and producing novobiocin.

Medium No. 1: Percent
  Soybean meal _____ 2
  Sodium chloride _____ 0.25
  Dextrose _____ 1–3
  Distiller's solubles _____ 0.75
Medium No. 2:
  Corn Steep Liquor _____ 2–6
  Dextrose _____ 2–4
Medium No. 3:
  Distiller's solubles _____ 3–6
  Dextrose _____ 1–6
Medium No. 4:
  Distiller's solubles _____ 3–6

The fermentation using the novobiocin-producing microorganism can be carried out at temperatures ranging from about 20–37° C. For optimum results, we find it most convenient to conduct these fermentations at temperatures of 24–28° C. The pH of the nutrient mediums suitable for growing *Streptomyces spheroides* and producing the antibiotic can vary from about 5.5 to 9.0.

Although novobiocin is produced by both surface and submerged culture, it is presently preferred to carry out the fermentation in the submerged state. Small-scale fermentations are conveniently carried out by placing suitable quantities of nutrient medium in flasks, sterilizing the flask and contents by heating at 120° C., inoculating the flask with either spores or a vegetative cellular growth of a novobiocin producing strain of *Streptomyces spheroides*, loosely stoppering the necks of the flasks with cotton and permitting the fermentation to proceed in a constant temperature room at about 25° C. on a shaker for about two to seven days. For larger scale work it is preferable to conduct the fermentation in suitable tanks provided with an agitator and a means of aerating the fermentation medium. In this method the nutrient medium is made up in the tank and sterilized by heating at 120° C. for a suitable length of time. After cooling, the sterilized medium is inoculated with a suitable source of vegetative cellular growth of a novobiocin producing strain of *Streptomyces spheroides* and the fermentation is permitted to proceed to two to seven days while agitating and/or aerating the nutrient medium and maintaining the temperature at about 24–27° C. This method of producing novobiocin is particularly suited for the preparation of large quantities of this new antibiotic.

In carrying out the production of novobiocin in the submerged state, a small amount of a suitable antifoam agent such as soybean oil, castor oil, lard oil, 1% octa decanol in mineral oil, or a substituted oxazoline sold under the trade name "Alkaterge C" by Commercial Solvents Corporation, and the like can be added to the fermentation broth to control excessive foaming during the fermentation.

The examples which follow are presented as illustrative of fermentation methods useful in the production of novobiocin.

EXAMPLE 1

A medium containing 2% soybean meal, 1% dextrose, 0.25% sodium chloride, and 0.75% distiller's solubles was made up in tap water. About 25 ml. of the prepared medium was placed in a 75 ml. vial and sterilized by heating at 120° C. for 20 minutes. The sterilized medium was then inoculated with a vegetative culture of *Streptomyces spheroides* MA-319 (NRRL 2449), and the vial loosely stoppered with cotton. The vial was then placed on a shaking machine with an amplitude of 1½ inches at 28% C. for six days. At the end of this fermentation time, the fermented broth was assayed using the cylinder-plate method with *Bacillus megatherium* ATCC 9885 as the assay organism and found to have an activity of 600 units/ml. or 30 mcg./ml. of novobiocin.

When another fermentation was carried out as described above using a medium containing 2% soybean meal, 3% dextrose, 0.25% sodium chloride and 0.75% distiller's solubles, the resulting fermented broth had a potency of 256 mcg. per ml.

Following the procedures described in Example 1, but increasing the fermentation time to seven days, three mediums containing (1) 4% distiller's solubles and 5% dextrose, (2) 2% corn steep liquor, 5% distiller's solubles, and 5% dextrose, and (3) 2% ground rye, 5% distiller's solubles and 5% dextrose were found to produce 511 mcg./ml., 720 mcg./ml. and 740 mcg./ml. of novobiocin respectively.

EXAMPLE 2

The production of larger quantities of novobiocin by submerged frementation in suitable tanks is conveniently carried out as follows:

A Blake bottle containing 25 ml. of sterile aqueous agar medium consisting of 1 percent yeast extract
1 percent dextrose
0.12 percent $Na_2HPO_4$
0.075 percent $KH_2PO_4$
0.05 percent $MgSO_4 \cdot 7H_2O$
2 percent agar dissolved in water was inoculated with a loopful of soil from a soil culture of *Streptomyces spheroides* MA-319 (NRRL 2449) and incubated at 26° C. for 4–5 days until well sporulated.

Twenty ml. of sterile water was then added to the Blake bottle and the spores scraped into suspension. About 5 ml. of the resulting spore suspension was added to a 2 liter baffled Erlenmeyer flask containing 750 ml. of a sterile aqueous medium consisting of 0.3 percent beef extract
1.0 percent casein hydrolysate (NZ amine)
10 percent dextrose
0.5 percent sodium chloride and having a pH of about 7.2. The flask was then stoppered with cotton and incubated at 26° C. on a rotary shaker for 48 hours.

The vegetative culture so prepared was then added to a 50 gallon stainless steel fermentor containing about 25–30 gallons of a sterile beef extract medium of the composition described above. After adding a small quantity of a 1% solution of octadecanol in mineral oil as an antifoam agent, the medium was incubated at 26° C. for 48 hours. During this incubation period the medium was agitated and sterile air was passed through the medium at the rate of about 3 c.f.m.

A 200 gallon stainless steel fermentor was then charged with about 100 gallons of an aqueous medium containing the following ingredients:

3 percent soybean meal (Staley's special nutrient soybean meal 4–S)
2 percent dextrose
0.75 percent distiller's solubles
0.25 percent sodium chloride This medium had a pH of about 7.1. After sterilizing the medium with steam at about 120° C. for thirty minutes and cooling, the fermentor was inoculated with about 8.4% of the vegetative inoculum prepared in the 50 gallon fermentor as described above. The batch was then incubated at 26° C. with agitation and aeration at the rate of 12 c.f.m. After 96 hours the fermented broth containing the antibiotic novobiocin had an activity of about 82 mcg. per ml.

The concentration of the new antibiotic substances in the fermentation mediums described above usually ranges from about 30–400 mcg. per ml. and the fermentation broth solids usually have an activity on the order of 1–2 mcg. per mgm. of solid. The active substances can be purified and recovered in a purer form by a number of procedures. One such procedure comprises extraction of the antibiotic substances from the alkaline fermentation medium with normal or secondary butanol. Other methods of purification which are described in detail in the co-pending application of Edward A. Kaczka, Serial No. 503,030 filed April 21, 1955, now Patent No. 2,895,952 can be utilized to obtain novobiocin in crystalline form. Thus, the crude antibiotic may be purified to a great extent by reprecipitation from alkaline solutions with acids, alumina chromatography, and by adsorption on suitable ion exchange resins, or combinations of such procedures. A procedure for the preparation of the novobiocin in crystalline form can be carried out as follows:

After filtering the whole broth at pH 9.0, 5 lbs. of diatomaceous earth filter aid (Hyflo Supercel) per 100 gal. of filtered broth was added. The broth was slowly acidified to pH 2.0 with hydrochloric acid. After 10 minutes agitation the batch was filtered and the cake washed with water. No antibiotic can be detected in the acid filtrate. The solids precipitated, exclusive of the filter aid, were ca. 0.2–0.3% pure.

The filter cake from acid precipitation was extracted twice with 85% aqueous methanol at pH 9.0 using approximately one-tenth the original broth volume for each extraction. Overall recovery through this extraction was approximately 80% of the total bioactivity present in the broth. The solids in solution were 1–1.5% pure.

The aqueous methanol solution was concentrated to a water solution, ca. one-tenth the volume of the original methanol solution. The pH was adjusted to 9.0 with caustic soda and the solution was extracted twice with equal volumes of n-butanol. The apparent distribution ratio at pH 9.0 is ca. 40:1. The solids in the butanol extract were 4–6% pure.

The butanol extract was concentrated to one-tenth the original volume and added to 15 volumes of water at pH 9.0. Filter aid (Hyflo Supercel) was added (ca. 0.5 gm./gal. based on original broth volume) and the pH was slowly adjusted to 2.0 by the addition of hydrochloric acid. All of the bioactivity is precipitated on the filter aid and is filtered off. Solids purity, exclusive of the filter aid, was ca. 10–12%.

The cake was dried in vacuo at 40° C., milled and triturated with petroleum ether (about 180–400 ml. for the solids derived from each gallon of fermentation broth) until the filtrate was colorless. This eliminates 20–25% of the solids present and removes inactive oily fermentation products which remained through previous processing. No bioactivity was lost by this trituration and the solids remaining were found to be 12–15% pure.

The cake was extracted with anhydrous ethanol until the ethanol extracts were very light yellow in color. These extracts were combined and concentrated to a solution of 15–20% solids with a bioassay of ca. 40,000 mcg./cc. This solid material was 20–30% pure with a bioassay of 200–300 mcg./mg.

The concentrated ethanol solution was chromatographed on acid-washed alumina. An alumina ratio of 50:1, based on total solids present in the feed solution, must be used in order to obtain a satisfactory purification. The active material passes on through the column while a large amount of the extraneous solid material present remains on the column. The alumina column was washed with ethanol to recover the novobiocin. Approximately 95% of the bioactivity was in 2.5–3 column void volumes.

*Table 1*

|  | Volume (cc.) | Bioassay (mcg./cc.) | mg./cc. | mcg./mg. | Total Units |
|---|---|---|---|---|---|
| Col. Feed | 1,000 | 44,000 | 265 | 166 | 220×10⁶ |
| Cut I [1] | 1,000 | 92 | 2.5 | 37 | 0.46×10⁶ |
| Cut II | 1,000 | 8,400 | 19.6 | 428 | 42×10⁶ |
| Cut III | 1,000 | 15,200 | 31.3 | 484 | 76×10⁶ |
| Cut IV | 1,000 | 12,400 | 22.3 | 556 | 62×10⁶ |
| Cut V | 1,000 | 7,400 | 13.4 | 552 | 37×10⁶ |
| Cut VI | 1,000 | 2,600 | 4.5 | 604 | 13×10⁶ |
| Cut VII | 1,000 | 900 | 1.3 | 690 | 4.5×10⁶ |
| Average of cuts | 7,000 | 6,700 | 13.2 | 504 |  |

Volume of alumina=8,000 cc.
Column void vol.=2,600 cc.
[1] (1st color).

The ethanol washes from the alumina column were concentrated to ca. 5% solids. Water was added to turbidity, slightly more than an equal volume being used, and the antibiotic allowed to crystallize. The crystallization took place very slowly. After five days there still remained in the supernatant liquors up to 15% of the original bioactivity. Agitation and/or temperature variation appear to have little effect upon the rate of crystallization. This crystalline novobiocin has a bioassay of about 500–600 mcg./mg.

This crystalline material was dissolved in anhydrous acetone to give a 30% solution. This solution was treated with an amount of activated charcoal (Darco G-60) equal to twice the weight of the crystalline material dissolved. The Darco was filtered off and washed repeatedly with acetone to dilute the solution to a concentration of about 5% solids. Petroleum ether was added to turbidity and the novobiocin allowed to crystallize. 90–95% of the bioactivity was recovered and the crystalline novobiocin obtained assayed 900–1,000 mcg./mg.

Salts of novobiocin are readily produced by reacting novobiocin with bases. The following examples show the preparation of illustrative salts.

EXAMPLE 3

*Monosodium salts of novobiocin.*—About 40 g. of novobiocin was dissolved in 800 ml. of ethyl acetate at about 80° C. After cooling the resulting solution to about 25° C., a solution of 3.43 g. of sodium methoxide in 34 ml. of methanol was added over a period of 20–30 minutes. The precipitated monosodium salt of novobiocin was recovered by filtration and washed with about 200 ml. of ethyl acetate. The filtered product was then dried at 70° C. for six hours under reduced pressure, and then finally at 55° C. for 24 hours under reduced pressure.

The monosodium salt of novobiocin so obtained was prepared in crystalline form by dissolving 1.1 g. in 3 ml. of methanol, diluting the resulting clear solution with 55 ml. of acetone to obtain a turbid solution, seeding the turbid solution with a few crystals of sodium novobiocin, and allowing the solution to stir at room temperature for about four hours, or until the crystallization of the sodium salt was complete. The resulting precipitated crystals of monosodium novobiocin were washed with acetone and dried under reduced pressure.

EXAMPLE 4

*Novobiocin-spiramicin salt.*—To a solution of 5 g. of the monosodium salt of novobiocin in 50 ml. of water was added with stirring a solution of 4.5 g. of spiramycin sulfate in 40 ml. of water adjusted to pH 7. The resulting novobiocin-spiramycin salt which formed precipitated from the solution. The precipitated salt was filtered off and dried under reduced pressure. The solid product so obtained was soluble in methanol, amyl acetate, acetone and partially soluble in ethylenedichloride.

EXAMPLE 5

*Novobiocin-neomycin salt.*—To a solution of 5 g. of neomycin sulfate in 50 ml. of water was added with stirring 250 ml. of a 10% solution of novobiocin in water at pH 7. The precipitated novobiocin-neomycin salt was recovered by filtration and dried under reduced pressure.

EXAMPLE 6

*Novobiocin-dihydrostreptomycin salt.*—To a solution of 5 g. of dihydrostreptomycin sulfate in 50 ml. of water at pH 7 was added with stirring 145 ml. of a 10% aqueous solution of the monosodium salt of novobiocin. The precipitated novobiocin-dihydrostreptomycin salt in the form of a solid was filtered off and dried under reduced pressure.

EXAMPLE 7

*Novobiocin-streptomycin salt.*—A solution of 100 g. of the monosodium salt of novobiocin in one liter of water was filtered. To the resulting filtered solution was added with stirring a solution of 40 g. of streptomycin sulfate in 40 ml. of water adjusted to pH 7 with sodium hydroxide. The resulting precipitate was filtered, washed with water and dried under reduced pressure to obtain the novobiocin-streptomycin salt in solid form.

EXAMPLE 8

*Calcium salt of novobiocin.*—To a solution of 10 g. of the monosodium salt of novobiocin in 200 ml. of water was added with stirring 20 ml. of a 10% calcium chloride solution adjusted to pH 10. The resulting slurry was stirred for an additional 30 minutes. The precipitate was then filtered off, washed with water, and dried.

Four grams of the solid salt of novobiocin so obtained were dissolved in 40 ml. of methanol, 25 ml. of water was added and the resulting solution was stirred overnight at room temperature. The crystalline calcium salt of novobiocin which precipitated was filtered off and dried. The product so obtained contained 2.6% of calcium, had an equivalent weight of 669 by titration (pH ½10.8 in acetone-water, and had a $E_{1cm}^{1\%}$ of 528 at 307μ in 0.1 N sodium hydroxide solution.

The magnesium salt of novobiocin was prepared in the same manner as the calcium salt described in the foregoing example by reacting magnesium chloride with sodium novobiocin.

Following the procedures described in Examples 4–7 above and using an appropriate amount of an acid salt of benzyl trimethyl ammonium, quinine, procaine, guanidine, noformacin, N-benzyl-β-phenylethylamine, and N,N-dibenzylethylenediamine, the corresponding salts of novobiocin were produced.

Novobiocin salts are also prepared by other methods. Thus, amine salts are obtained by reacting novobiocin with approximately an equivalent amount of the amine in ethyl acetate solution. The amine salt of novobiocin precipitates from solution, is filtered, washed with ethyl acetate and dried. Using this procedure the cyclohexylamine, quinine, N-ethylpiperidine, triethylamine, dicyclohexylamine, ethylene diamine and isobutylamine salt of novobiocin were prepared.

Another method for the preparation of novobiocin salts comprises reacting novobiocin with an equimolar amount of an amine in aqueous methanolic solution, and then evaporating the solvent under reduced pressure. Thus, the arginine, histidine and lysine salts of novobiocin were prepared by this method.

Novobiocin and its salts are useful antimicrobial agents. For example, they can be utilized to remove susceptible microorganisms from pharmaceutical equipment and the like, or to separate certain microorganisms from solutions containing mixtures of several microorganisms. Also, novobiocin or its salts are useful in the treatment of animals infected with microorganisms which are susceptible to the action of our new antibiotic. For example, novobiocin has been found to be very useful in the treatment of mastitis in cows. Mastitis ointments containing 20–100 mgs. per 7.5 g. of sodium novobiocin are suitable for this purpose.

Novobiocin and salts thereof are active against penicillin resistant staphylococci and also against streptococci and pneumococci. Since these organisms are responsible for most bacterial respiratory infections, novobiocin can be used in the treatment of such infections in humans. For this purpose the sodium salt of novobiocin can be administered orally in the form of capsules containing, for example, about 100 to 500 mgs. of the antibiotic at a daily dosage level of one to two grams. Thus, a suitable dosage form is prepared by encapsulating 250 mgs. of the monosodium salt in a No. 1 soft gelatin capsule. Alternatively, novobiocin and its salts can be administered in the form of tablets. Such tablets can be prepared by mixing powdered sodium novobiocin with a small amount of a 5% solution of cellulose acetate hydrogen phthalate in methanol-acetone (50–50), granulating the material through a No. 8 sieve, drying the resulting granules, putting the dried granules through a No. 12 sieve, and compressing the resulting granules with the addition of a small amount of magnesium stearate to form tablets containing 250 mg. of sodium novobiocin.

Novobiocin is also effective in the treatment and control of plant diseases. Thus, it can be used in the control of bean blight caused by *Xanthomonas phaseoli*. For this purpose the plants are sprayed with an aqueous solution containing about 100 parts per million of the sodium salt of novobiocin. Such sprays may contain various wetting or spreading agents and/or other active agents, and can be prepared in accordance with methods well known in the art.

Novobiocin units are related to the microbiological activity of substantially pure crystalline novobiocin; the microbiological activity of substantially pure crystalline novobiocin has been arbitrarily taken as 5,000 units per milligram, as determined by standard cup-plate diffusion methods, using *Bacillus megatherium* ATTC 9885 or, preferably, *Bacillus subtilis* ATTC 12,432 as the test organism. When this strain of *B. subtilis* is used as the test organism, the assay procedure can be carried out as follows:

A culture of *B. subtilis* ATTC 12,432 is cultivated on brain heart infusion agar slants (Difco Manual, 9th edition, pages 90, 91) for 24 hours at 37° C. and is then stored at 5° C. for periods no longer than a month. For preparation of spores, an inoculum is prepared by adding 5 ml. of sterile, distilled water to a freshly cultivated *B. subtilis* slant. The cells are aseptically scraped from the slant, mixed well, and transferred to 50 ml. of sterile distilled water in an Erlenmeyer flask. Two ml. of the bacterial suspension is added, as an inoculum to a Roux bottle containing a medium consisting of 3 percent soybean meal, 0.2 percent NaCl, 0.4 percent distillers' solubles, 0.8 percent dextrose, and 2.0 percent agar. After incubation for 7 days at 37° C. the bacterial growth obtained is suspended in 50 ml. of sterile, distilled water and pasteurized at 65° C. for 30 minutes. Four ml. of a 1:50 dilution of this spore suspension is used per liter of assay medium containing 0.5 percent peptone, 0.3 percent beef extract, 0.3 percent yeast extract, and 1.5 percent agar at a pH of 5.9–6.1. Fifteen ml. quantities of seeded medium are distributed into deep flat-bottom Petri dishes.

Six stainless steel cylinders are placed on the seeded agar. Three alternate cylinders are filled with standard solution of 4 micrograms of novobiocin/ml. (equivalent to 20 units of novobiocin/ml.), and three with the unknown solution diluted approximately to the same potency with M/20 phosphate buffer at pH 6.0. A daily standard curve is prepared with pure novobiocin diluted to various concentrations ranging from 2 to 16 μg./ml.

After 18 hours' incubation at 28° C., diameters of the inhibitory zones of the unknown and the standard solutions on each plate are measured. The potency of the unknown is determined from a nomograph based on the degree of response at various concentrations established from the daily standard curve.

Various changes and modifications in the procedures herein disclosed will occur to those skilled in the art, and to the extent that such changes and modifications are embraced by the appended claims, it is to be understood that they constitute part of our invention.

What is claimed is:
1. A compound from the group consisting of novobiocin having the structure

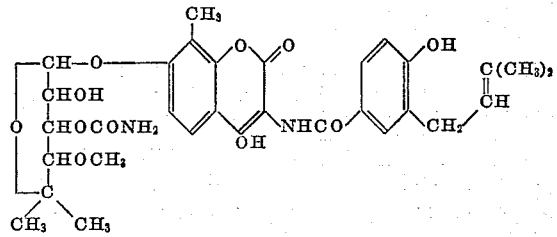

and salts thereof.

2. The compound novobiocin having the structure

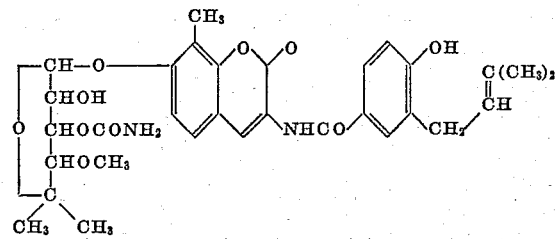

3. A salt of the compound of claim 2.
4. The monosodium salt of the compound of claim 2.
5. The calcium salt of the compound of claim 2.
6. The magnesium salt of the compound of claim 2.
7. A salt of the compound of claim 2 and an organic base.
8. An amine salt of the compound of claim 2.
9. The streptomycin salt of the compound of claim 2.
10. The dihydrostreptomycin salt of the compound of claim 2.
11. A process for producing novobiocin which comprises cultivating *Streptomyces spheroides* in an aqueous nutrient medium under aerobic conditions until substantial antimicrobial activity is imparted to said medium, and recovering said novobiocin from the resulting fermented broth.
12. A process for producing novobiocin which comprises cultivating *Streptomyces spheroides* NRRL 2449 in an aqueous nutrient medium under aerobic conditions until substantial antimicrobial activity is imparted to said medium.
13. A process for producing novobiocin, which comprises growing *Streptomyces spheroides* NRRL 2449 in an aqueous nutrient medium containing sources of assimilable sources of carbon and nitrogen, and inorganic salts under aerobic conditions at a temperature within the range of 24–28° C. for a period of about 1–7 days.

References Cited in the file of this patent

UNITED STATES PATENTS

| | | |
|---|---|---|
| 2,504,067 | Collingsworth | Apr. 11, 1950 |
| 2,516,682 | Donovick | July 25, 1950 |
| 2,537,934 | Lott et al. | Jan. 9, 1951 |
| 2,565,653 | Fried | Aug. 28, 1951 |

OTHER REFERENCES

Shunk et al.: 78 J.A.C.S. 1770–71 (April 20, 1956).

Welch et al.: Antibiotics & Chemotherapy, vol. 5 (Dec. 1955), pp. 670–678.

Hoeksema et al.: J. Am. Chem. Soc., vol. 78 (May 1956), pp. 2019–2020.

Wallick et al.: Antibiotics Annual 1955–56, pp. 909–914.

Smith, et al.: Antibiotics & Chemotherapy, vol. 6, No. 2, Feb. 1956, pp. 135–142.

Abstracts of Papers No. 90 and 131–133 presented at the Antibiotic Symposium, Nov. 2–4, 1955 in Wash., D.C.

UNITED STATES PATENT OFFICE
CERTIFICATE OF CORRECTION

Patent No. 3,049,534                         August 14, 1962

Hyman Wallick

It is hereby certified that error appears in the above numbered patent requiring correction and that the said Letters Patent should read as corrected below.

Column 12, lines 41 to 50, the formula should appear as shown below instead of as in the patent:

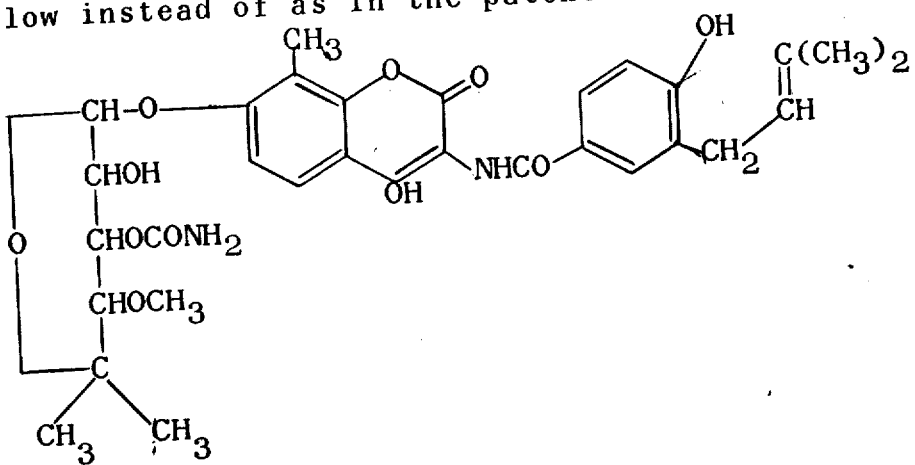

Signed and sealed this 15th day of January 1963.

(SEAL)
Attest:
ERNEST W. SWIDER
Attesting Officer

DAVID L. LADD
Commissioner of Patents